Aug. 16, 1932. A. AARSKOG ET AL 1,871,575
MACHINE FOR MOLDING AND PRESSING OIL SEED CAKES OR THE LIKE
Filed Aug. 19, 1930 3 Sheets-Sheet 1
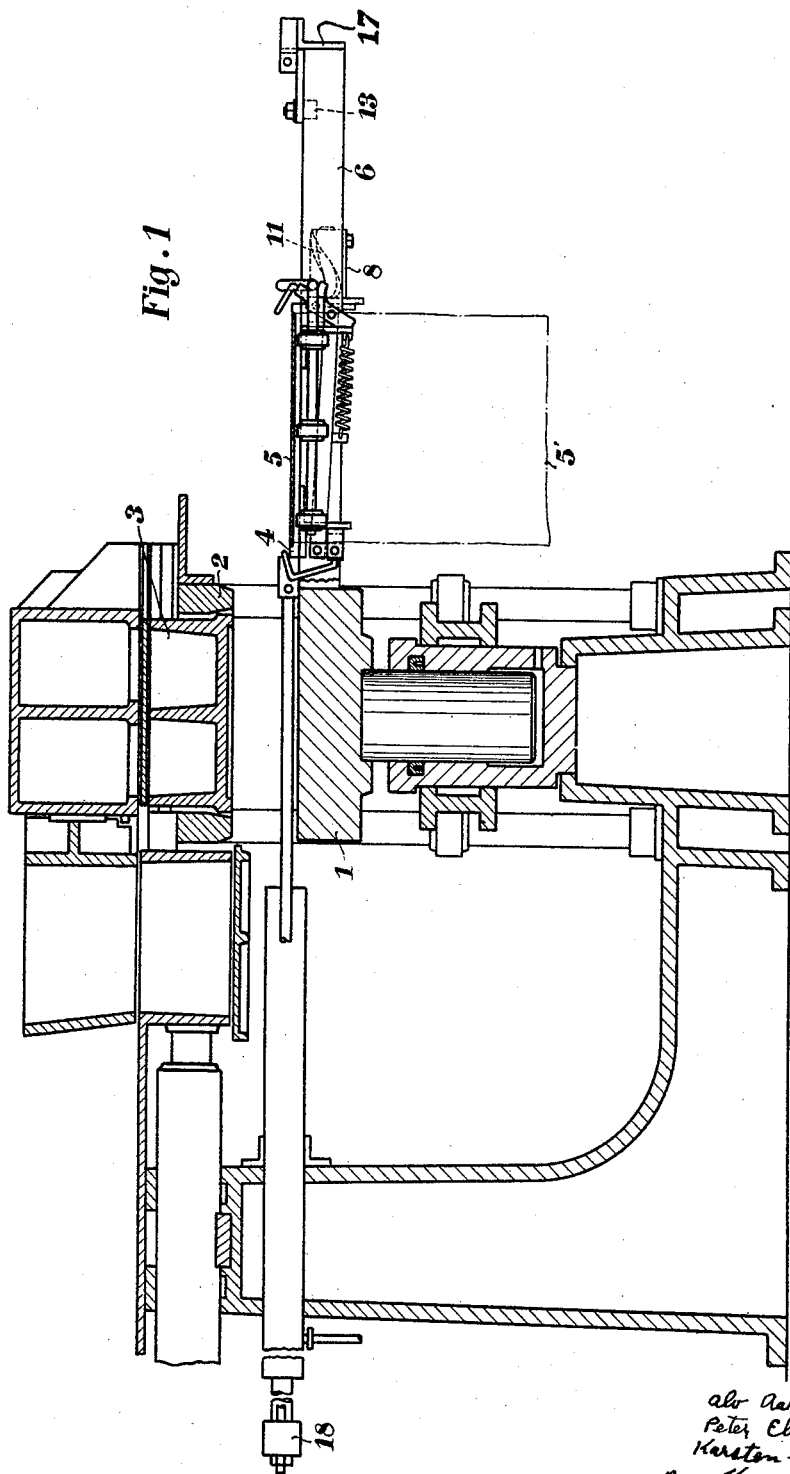

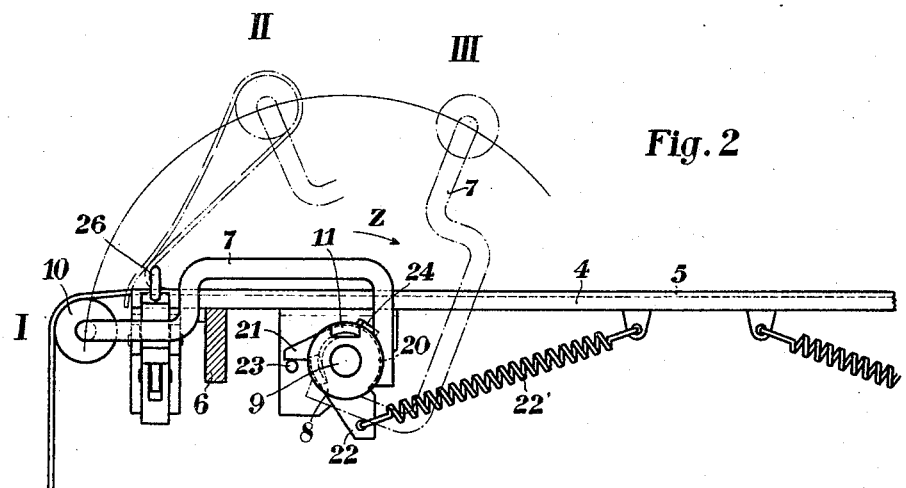
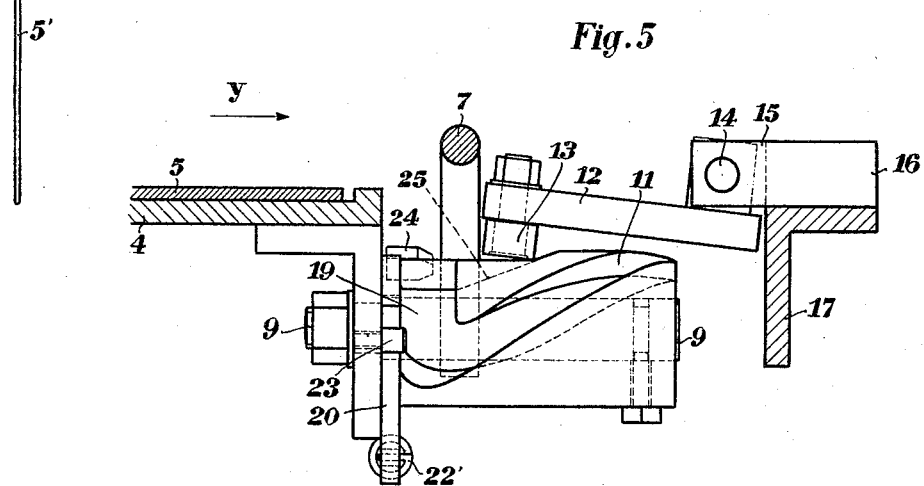

Aug. 16, 1932.  A. AARSKOG ET AL  1,871,575
MACHINE FOR MOLDING AND PRESSING OIL SEED CAKES OR THE LIKE
Filed Aug. 19, 1930   3 Sheets-Sheet 3
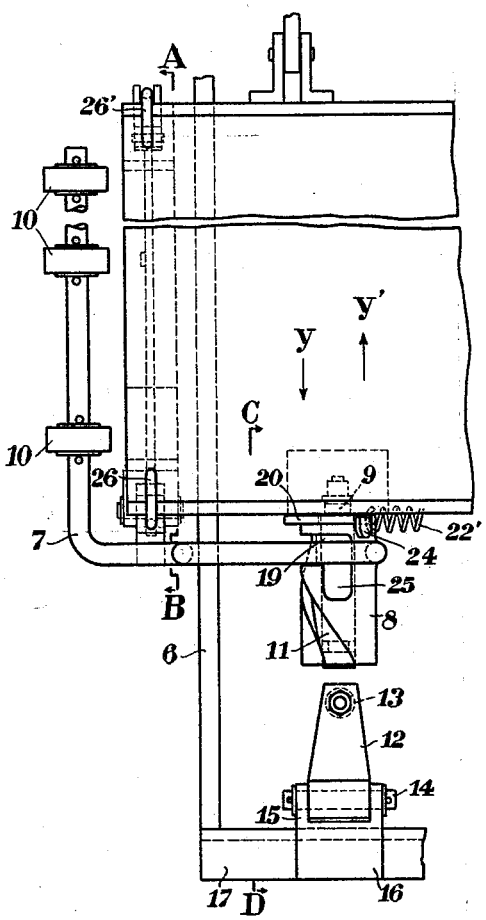
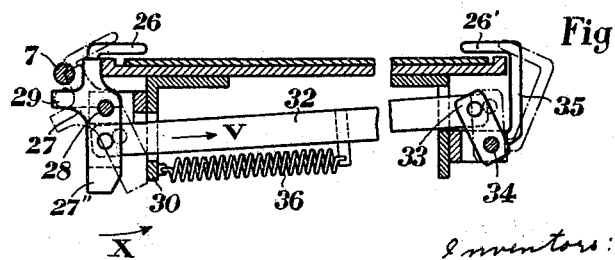

Patented Aug. 16, 1932

1,871,575

UNITED STATES PATENT OFFICE

ALV AARSKOG AND KARSTEN SVENDSEN, OF STAVANGER, NORWAY, AND PETER EBEL, OF MAGDEBURG, GERMANY, ASSIGNORS TO THE FIRM AKTIESELSKABET LILLEBORG FABRIKER, OF STAVANGER, NORWAY

MACHINE FOR MOLDING AND PRESSING OIL SEED CAKES OR THE LIKE

Application filed August 19, 1930, Serial No. 476,362, and in Germany August 29, 1929.

The invention relates to a machine for molding and pressing oil seed cakes or the like, in which the seed material is pressed, for example by means of a pressure member, into a cake mold resting on a press table. Between the cake mold and the press table there is a mold plate upon which the cloth for wrapping up the press cake lies. During the pressing of the cake this cloth hangs down on both sides of the mold plate, its free ends, after the preparation of the press cake, the removal of the cake mold and the withdrawal of the mold plate from the press, being thrown over the cake whereupon the latter is taken from the mold plate. The wrapping of the cake hitherto has been effected by hand which is tedious, takes up much time and is not uniform, and the object of the present invention is to overcome these difficulties.

The invention consists in the provision in a machine of the above mentioned type of apparatus which, after the preparation and release of the pressed cake, automatically throws the depending ends of the cloth over the cake. For this purpose movable arms are used, fitted upon the mold plate or upon the bars provided on the press table to guide the mold plate. As the turning over of the cloth is, according to the invention, quite automatic, the worker's time hitherto necessary for this may be used for other purposes, as for example, for attending to the cake-cutting machine.

In the accompanying drawings one way of carrying out the invention is shown:—

Figure 1 illustrates a cake press constructed according to the invention, partly in longitudinal section, partly in elevation, Figure 2 shows a form of construction of the turning-over apparatus in front view.

Figure 3 is a plan of the left-hand half of the apparatus on a larger scale,

Figure 4 shows a section on the line A—B of Figure 3, and

Figure 5 is a similar view on line C—D of Figure 3.

In the machine for molding and pressing cakes illustrated, a cake mold 2 containing the seed material and resting on a press table 1 is moved against a pressure member 3 penetrating into the mold and, after the pressing is completed, is lifted from the cake still under pressure by means of a suitable lifting device. The cake mold 2 rests in its lowest position on a mold plate 4 over which a wrapping cloth 5 is spread. The press table 1 carries at one side projecting rails 6 which serve to support the mold plate 4, when, after the pressing of the cake and the upward movement of the cake mold 2, it is brought into the position shown in Figure 1. In this position of the plate the prepared cake is removed, after the ends 5' of the wrapping cloth 5 have been laid over the cake. For the automatic wrapping of the cloth, the following apparatus is used:—On the front of the mold plate 4 there are two angle-shaped arms 7, 7' (Figures 2, 3, 5), one end of each of which is firmly connected with a bush 8 or 8', itself rotatably fitted on bolts 9, 9' fixed on the plate 4. The other end of the arm 7 or 7', bent at a right angle, extends along the longitudinal side of the mould plate 4 and carries rollers 10 or 10', over which, in the position of rest of the arms, the free ends 5' of the wrapping cloth 5 hang, (Figures 1 and 2). As both arms 7, 7' are mounted and shaped alike and as their functions are the same, only the means of movement of the arm 7 and its method of operation will be described in detail. In the circumference of the bush 8 carrying the arm 7, a helical groove 11 (Figures 3 and 5) is cut, into which a roller 13 penetrates towards the end of the withdrawal movement of the mold plate 4. The roller is arranged at the free end of a lever 12, pivoted at 14 in a fork-shaped projection 15 from a support 16 which is mounted on a bar 17 connecting the two guide rails 6 for the mold plate. If the mold plate is pushed sideways entirely out of the press, which in the example can be effected by means of the hydraulic piston 18 (Figure 1), the roller 13 enters the groove 11, rotates the bush 8 in the direction of the arrow z and at the same time oscillates the arm 7 in the same direction out of the position of rest I into the end position III shown dotted. This causes the arm 7 to lift the depending end 5' of the wrapping cloth 5 and to place it over the cake. The groove 11 ends in a groove 19 running circularly around the bush over a part of its circumference and the roller 13 enters this groove after leaving the helical groove. On the bolt 9 a disc 20, provided with two projections 21 and 22 is also rotatably fitted. A tension spring 22' is attached to the projection 22 and tends to rotate the disc 20 in the opposite direction to the arrow $z$, whereby the projection 21 normally bears against a stop 23 arranged on the mold plate 4. When the mold plate is moved in the direction of the arrow $y$ the bush 8 is rotated under the action of the roller 13, which is in the groove 11, and a projection 24 on the bush encounters the projection 22, thereby rotating the disc 20 and tensioning the spring 22'. As soon as the roller 13, at the end of the withdrawal movement of the plate 4, moves out of the groove 11 (the arm 7 being then in its right-hand end position) into the short cross groove 19, the spring 22', then tensioned, rotates the disc 20 in the opposite direction to the arrow $z$ until the projection 21 abuts against the stop 23. At the same time the bush 8 is rotated owing to contact between the projections 22 and 24, and the arm 7 is thus swung back in the opposite direction to that of the arrow $z$ (Figure 1). The arm 7 receives under the action of the spring 22' such an acceleration that it automatically swings back into its initial position as soon as the projection 21 bears against the stop 23. From the groove 19 an inclined surface 25 runs in the axial direction, starting at the bottom of the groove and rising to the surface of the bush; this effects an automatic lifting of the roller 13 out of the groove 19 when the mold plate 4 is moved in the direction of the arrow $y^1$ and thus the roller is released from the bush 8.

In order not to damage the edges of the cake lying on the mold plate 4 on throwing over the depending ends of the cloth 5, the following apparatus, more fully explained by Figure 4, is provided:—In the vicinity of the two ends of the mold plate 4, fingers 26 or 26' project at a certain height above the cloth. The finger 26 is fitted at the upper end of a double lever 27 which can swing about the axis 28 and carries a stop 29 on which the arm 7 rests in its normal position. The lever 27 has then the inclined position shown in broken lines when its lower limb 27'' rests against the stop 30 arranged on the mold plate. The fingers 26 and 26' take up the position shown in broken lines and are then not in the way during the pressing operation and removal of the cake. The lever 27 is connected by a hinged link 32 with a lever 33, which is rotatably mounted on the bolt 34 and carries an arm 35 which ends at the top in the finger 26'. To the link 32 there is attached a spring 36, which, on the swinging out of the double lever 27 in the direction of the arrow $x$ and the displacement thereby caused of the link 32 in the direction $v$, is tensioned. When the ends of the cloth are to be placed round the cake and for this purpose the arm 7 is rocked in the direction of the arrow $z$, the arm rises from the projection 29 of the lever 27 and the link 32 is then displaced under the action of the spring 36 in a direction opposite to that of the arrow $v$ thus rocking the lever 27 and the arm 35 until the fingers 26 and 26' take up the position shown in Figure 4 above the cloth. In this position (Figures 2 and 4) the fingers 26, 26' serve on each side of the mold plate as stops for folding the ends 5' of the wrapping cloth when lifted and swung round by the arms 7 or 7', as will be seen from position II of the arm 7 (Figure 2), so that no damage to the edges of the cake can take place on the front of the cake. On the swinging back of the arms 7, 7', the fingers 26, 26' under the cloth move out sideways.

Instead of arranging the turning-over arms 7, 7' on the mold plate itself, they may be rotatably mounted at the end of the beams serving as runners for the mold plate. On the withdrawal of the latter from the press, in this case the arms slide alongside the front of the mold plate, are raised by devices controlled by the plate and then swung towards each other, thus effecting the wrapping of the cloth.

What we claim is:

1. In a press cake forming machine, the combination of a press for forming the cake, cake supporting and cloth holding means co-operating with the press and movable to and from the same and means actuated by the cake supporting and cloth holding means upon its movement from the press for folding opposite ends of the cloth carried thereby around the cake.

2. In a press cake forming machine, the combination of a press for forming the cake, a cake supporting and cloth holding mold plate co-operating with the press and mounted for withdrawal therefrom and means actuated upon withdrawal of the mold plate from the press for automatically folding opposite ends of the cloth carried thereby around the cake.

3. In a press cake forming machine, the combination of a press for forming the cake, a cake supporting and cloth holding mold plate co-operating with the press and mounted for withdrawal therefrom and means actuated upon withdrawal of the mold plate from the press for automatically folding opposite ends of the cloth carried thereby around the cake, comprising pivoted arms disposed at opposite ends of the mold plate and over which the ends of the cloth extend, said arms being movable over the cake to thereby wrap the cake in the cloth.

4. The combination as described in claim 3, in which each of the said arms is attached to a helically grooved bushing pivoted to the mold plate and adapted to co-operate with a relatively fixed roller to oscillate the arms at a predetermined stage during the withdrawal movement of the mold plate.

5. In a press cake forming machine, the combination of a press for forming the cake, a cake supporting and cloth holding mold plate co-operating with the press and mounted for withdrawal therefrom and means actuated upon withdrawal of the mold plate from the press for automatically folding opposite ends of the cloth carried thereby around the cake, comprising pivoted arms disposed at opposite ends of the mold plate and over which the ends of the cloth extend, means for oscillating said arms about the mold plate to wrap the cake in the cloth, comprising helically grooved pivoted bushings carried by the mold plate and to which said arms are attached, relatively fixed rollers co-operating with the grooves in said bushings at a predetermined stage during the withdrawal movement of the mold plate and means for returning the arms to their initial terminal position, comprising discs mounted to rotate about the pivots for the bushings, projections on said discs adapted to contact with projections on the bushings to rotate the discs at the end of the operative movement of the arms and spring means tensioned by the rotation of the discs, whereby when the rollers leave the helical grooves in the bushings the arms are returned to their initial terminal position.

6. The combination as described in claim 3, in which two oscillating fingers are positioned at both ends of the mold plate opposite each other and upon operative movement of the arms serve as stops for folding the cloth ends substantially as and for the purpose described.

7. The combination as described in claim 3, in which two link and lever coupled and oppositely disposed fingers are positioned at the front of the mold plate for defining the folding edges of the cloth ends, and the fingers are mounted to swing out into a position of rest in response to the returning movement of the cloth folding arms.

The foregoing specification signed at Stavanger, Norway, this twenty-first day of July, 1930, and at Berlin August, 1930.

ALV AARSKOG.
KARSTEN SVENDSEN.
PETER EBEL.